(12) United States Patent
Le-Meur et al.

(10) Patent No.: US 11,215,058 B2
(45) Date of Patent: Jan. 4, 2022

(54) PROPELLER BLADES

(71) Applicant: Ratier-Figeac SAS, Figeac (FR)

(72) Inventors: Kevin Le-Meur, Figeac (FR); Patrice Brion, Lunan (FR)

(73) Assignee: RATIER-FIGEAC SAS, Figeac (FR)

( * ) Notice: Subject to any disclaimer, the term of this patent is extended or adjusted under 35 U.S.C. 154(b) by 122 days.

(21) Appl. No.: 16/692,273

(22) Filed: Nov. 22, 2019

(65) Prior Publication Data
US 2020/0165919 A1 May 28, 2020

(30) Foreign Application Priority Data
Nov. 27, 2018 (EP) ..................................... 18290134

(51) Int. Cl.
*F01D 5/14* (2006.01)
(52) U.S. Cl.
CPC .......... F01D 5/147 (2013.01); *F05D 2230/80* (2013.01); *F05D 2230/90* (2013.01)
(58) Field of Classification Search
CPC ............... F01D 5/147; Y10T 29/49336; Y10T 29/49337; Y10T 29/49616
See application file for complete search history.

(56) References Cited

U.S. PATENT DOCUMENTS

| | | | | |
|---|---|---|---|---|
| 3,923,421 A | * | 12/1975 | Carter | B64C 27/46 416/224 |
| 4,892,462 A | * | 1/1990 | Barbier | B29D 99/0025 416/134 A |
| 5,100,494 A | * | 3/1992 | Schmidt | B29C 65/342 156/712 |
| 10,239,604 B2 | * | 3/2019 | Foskey | B64C 29/0033 |
| 2014/0291448 A1 | | 10/2014 | Luck | |
| 2018/0333922 A1 | * | 11/2018 | Meur | B29D 99/0028 |

FOREIGN PATENT DOCUMENTS

| | | | | |
|---|---|---|---|---|
| DE | 69207206 T2 | 6/1996 | | |
| DE | 102008055539 A1 | 6/2009 | | |
| EP | 3246247 A1 | 11/2017 | | |
| EP | 3333080 A1 | 6/2018 | | |
| GB | 2463250 A | * | 3/2010 | ............. B29C 66/54 |
| GB | 2463250 A | 3/2010 | | |

OTHER PUBLICATIONS

Extended European Search Report for International Application No. 18290134.8 dated May 8, 2019, 13 pages.
Peggy Malnati, Reversible Multi-Material Adhesive Bonds, Nov. 13, 2017, 9 pages, retrieved from the Internet: URL:https://www.compositesworld.com/articles/reversible-multi-material-advesive-bonds, on Apr. 29, 2019.

* cited by examiner

*Primary Examiner* — Jason L Vaughan
*Assistant Examiner* — Amanda Kreiling
(74) *Attorney, Agent, or Firm* — Cantor Colburn LLP

(57) ABSTRACT

A propeller blade comprises a composite blade spar and at least one cover shell section adhesively bonded to the blade spar by a thermoplastic adhesive.

15 Claims, 4 Drawing Sheets

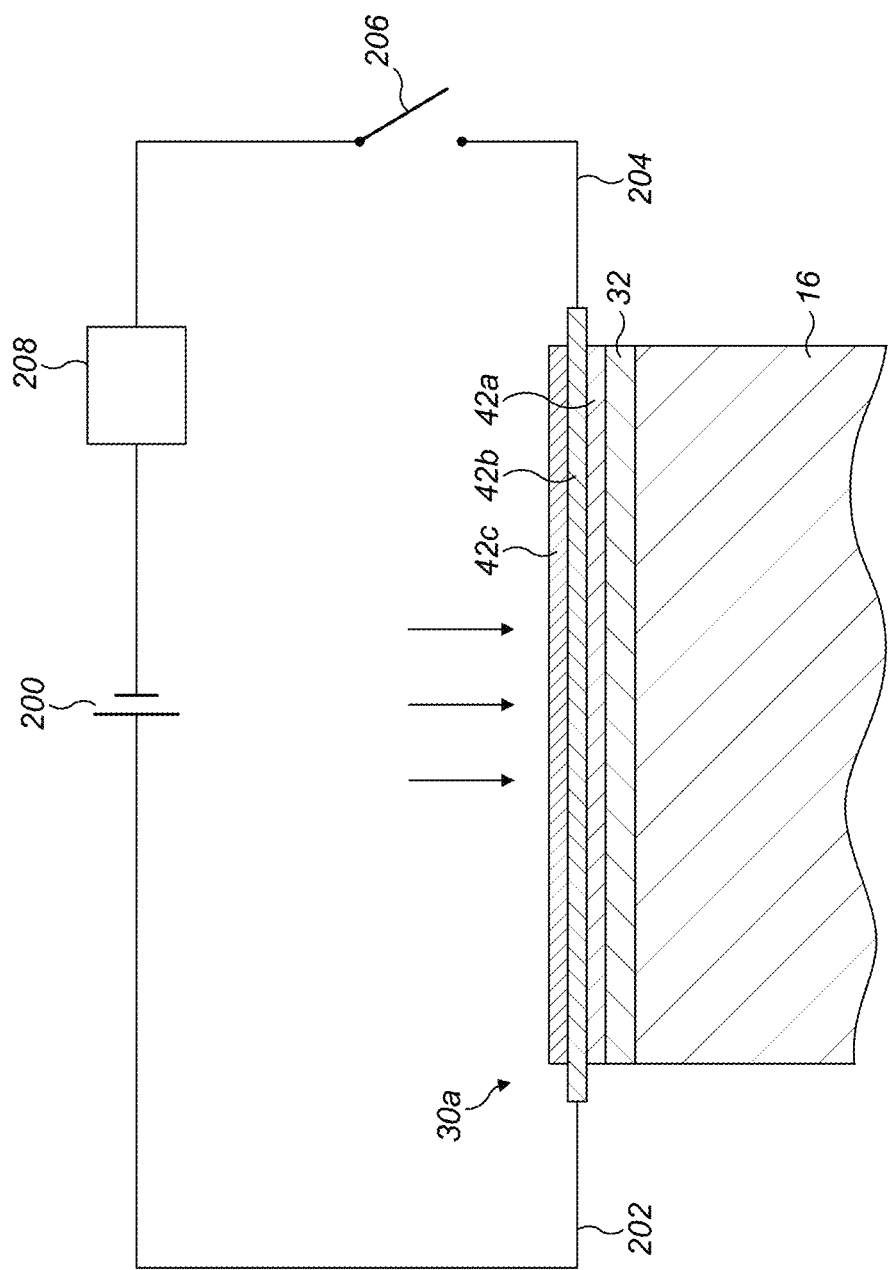

PROPELLER BLADES

FOREIGN PRIORITY

This application claims priority to European Patent Application No. 18290134.8 filed Nov. 27, 2018, the entire contents of which is incorporated herein by reference.

TECHNICAL FIELD

The present disclosure relates to propeller blades and to methods of their manufacture and repair.

BACKGROUND

Propeller blades typically comprise a blade spar provided with one or more cover layers, typically of a fiber reinforced thermoset plastic material. The blade spar typically comprises a reinforced composite central structural section and leading and trailing edge inserts typically of a foam material. The covering layers maintain the integrity of the blade spar and provide an aerodynamic profile to the blade surface. The cover layers may also include layers such as a lightning protection layer which may include a metallic mesh structure. It may also include an external erosion resistant layer.

When a propeller blade is damaged, the damaged region of the blade surface has to be removed, the exposed blade surface prepared, for example by abrasive blasting, and new layers of material deposited on the exposed blade substrate. Where there are multiple layers of different materials and constructions, this can be time consuming and expensive.

SUMMARY

From a first aspect, the disclosure provides a propeller blade comprising a composite blade spar and at least one cover shell section adhesively bonded to the blade spar by a thermoplastic adhesive.

The propeller blade may comprise a first cover shell section covering a first side of the blade spar and a second cover shell section covering a second side of the blade spar.

The at least one cover shell section may comprise at least one fiber reinforced layer.

The at least one cover shell section may comprise a plurality of layers.

The layers may comprise, for example, an electrically conductive lightning protection layer.

The electrically conductive lightning protection layer may comprise a metallic mesh.

The layers may comprise an external erosion resistant layer.

The blade spar may comprise a structural spar element and leading and trailing edge cores, and a fiber layer wrapped around the structural spar element and the cores.

The propeller blade may further comprise an erosion resistant sheath and/or an electrical de-icer bonded to the blade with a thermoplastic adhesive.

In any of the above embodiments, the thermoplastic adhesive may be a PPO/PS (polyphenylene oxide/polystyrene), a modified PA (polyamide), PEI (polyether imide), PAEK (polyaryletherketone) or PEKK (polyetherketoneketone) adhesive.

The disclosure also provides a method of manufacturing a propeller blade comprising: adhesively bonding at least one cover shell section to a composite blade spar using a thermoplastic adhesive.

The disclosure also provides a method of repairing a propeller blade comprising a composite blade spar and at least one cover shell section adhesively bonded to the blade spar by a thermoplastic adhesive, the method comprising heating the propeller blade to a temperature above the melting temperature of the thermoplastic adhesive, removing a damaged shell section and adhesively bonding a replacement cover shell section to the blade using a thermoplastic adhesive.

That thermoplastic adhesive may be the same thermoplastic adhesive as attached the original cover shell sections to the blade spar, or a different adhesive.

In any of the above methods, a layer of thermoplastic adhesive may be deposited on opposed surfaces of the blade spar and the at least one cover shell section prior to attachment of the at least one cover shell section to the blade spar.

In any of the above methods, the heating may include passing an electric current through an electrically conductive layer provided in the at least one cover shell section.

The disclosure also extends to a method of heating a propeller blade during manufacture or repair, the method comprising passing an electrical current through an electrically conductive layer formed in a skin of the propeller blade.

Optionally, the electrically conductive layer may comprise a metallic mesh.

The disclosure also provides, broadly, a propeller blade comprising a composite blade spar and at least one component adhesively bonded to the blade spar by a thermoplastic adhesive.

BRIEF DESCRIPTION OF DRAWINGS

Some embodiments of the disclosure will now be described by way of example only with reference to the accompanying drawings in which;

FIG. 6 illustrates a heating mechanism for use in manufacturing a propeller blade.

DETAILED DESCRIPTION

Figure 1:
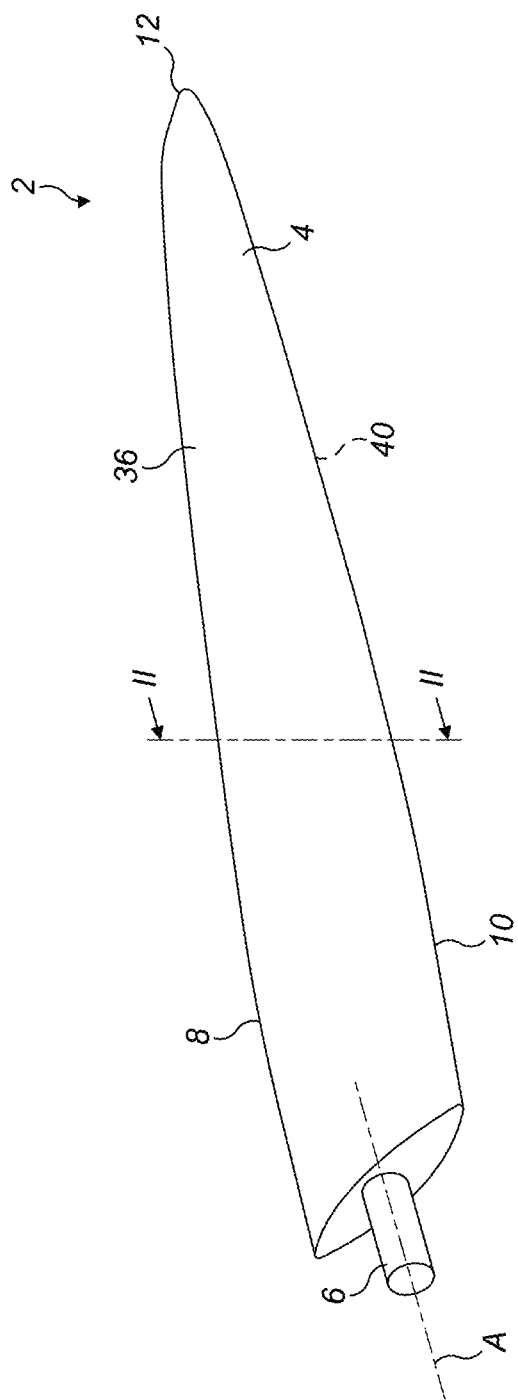
FIG. 1 illustrates schematically a propeller blade in accordance with the disclosure.
Figure 2:
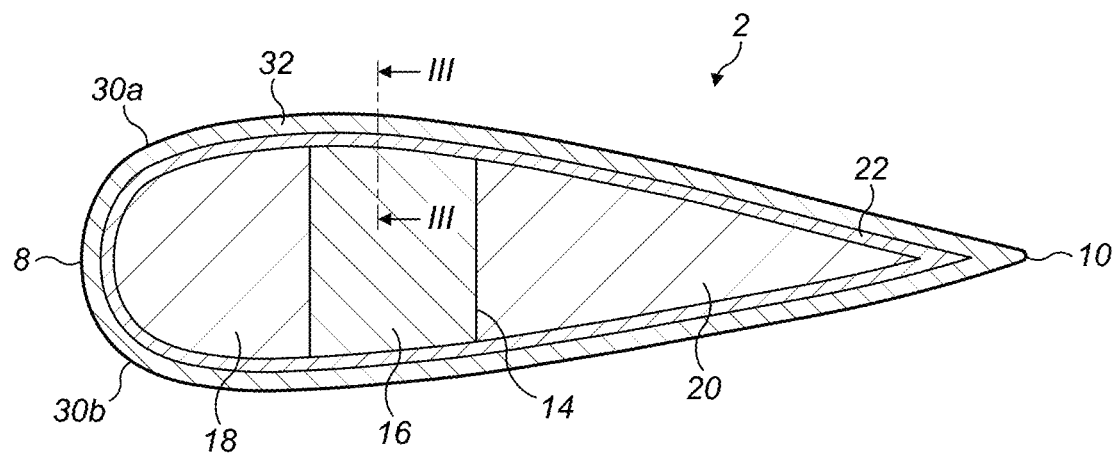
FIG. 2 shows a cross-section through the propeller blade of FIG. 1 taken along line II-II.

With reference to FIGS. 1 and 2, a propeller blade 2 comprises an airfoil section 4 and a root section 6. The root section 6 is retained in a hub (not shown) and may allow rotation of the blade 2 about an axis A of the blade 2.

The airfoil section 4 of the propeller blade 2 has a leading edge 8, a trailing edge 10 and a tip 12. As can be seen from FIG. 2, the blade 2 further includes a composite blade spar 14 which comprises a structural spar 16, a leading edge insert 18 and a trailing edge insert 20.

As is known in the art, the structural spar 16 may comprise a fiber reinforced composite material which provides the structural strength to the blade 2. Various structural spar constructions are known in the art so they do not need to be described further here. In a typical arrangement, however, the structural spar may comprise a foam core around which a number of layers (typically 10 to 30 layers) of fiber, for example carbon or glass fiber are deposited, for example braided, impregnated with a resin and cured.

The leading and trailing edge inserts 18, 20 provide a basic aerodynamic profile to the blade 2. For weight reasons the inserts 18, 20 may be made from a foam material. The leading edge and trailing edge inserts 18, 20 are positioned adjacent the leading edge and trailing edge of the structural spar 16 respectively and the spar 16 and the inserts 18, 20 are surrounded by a fiber layer 22, for example, a Kevlar® (Poly-paraphenylene terephthalamide) or fiber glass layer. In alternative embodiments the fiber layer could be in the form of a glass fiber or carbon fiber layer. The fiber layer 22 may be pre-impregnated with a resin or have resin applied to it prior to curing of the blade spar 14. The fiber layer 22 assists in holding the structural spar 16 and the inserts 18, 20 together. The fiber layer 22 may comprise just a single layer or multiple layers, for example two layers.

In a conventional blade, the exterior surface of the blade 2 is formed by the fiber layer 22. The surface may then need to be finished, and further material, for example an erosion resistant paint, may be deposited on the surface layer.

This is time consuming both in terms of manufacture but also in terms of repair of the blade should it be damaged by, for example, foreign object impact. In those circumstances, the damaged section of the blade will have to be removed, the exposed substrate prepared for repair, new layers of fiber material deposited in the damaged region, impregnated with resin and cured, and then any surface treatments such as painting be carried out on the newly deposited material. Not only is this process time consuming but it requires the appropriate storage of many materials, some of which have particular Environmental Health and Safety considerations.

The blade 2 of the present disclosure in its described embodiments seeks to mitigate these problems by means of its basic construction.

Figure 3:
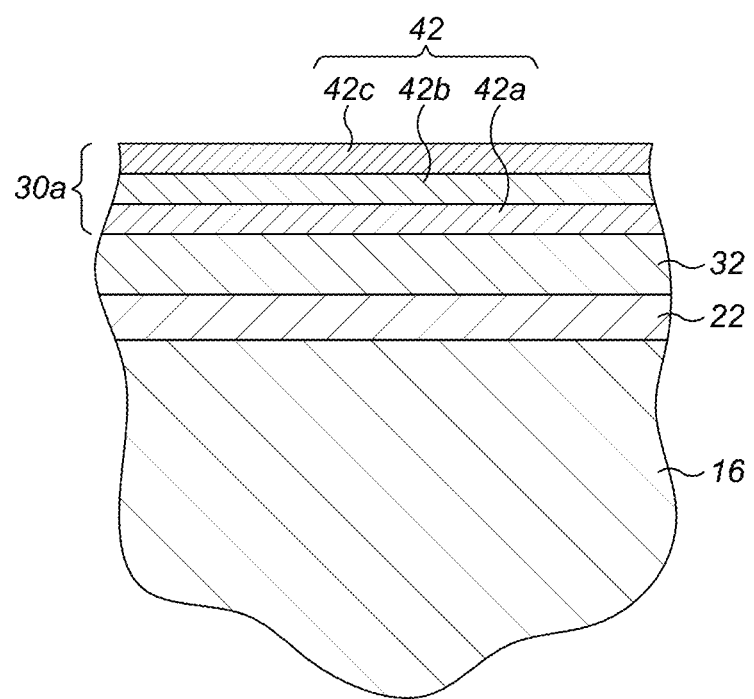
FIG. 3 shows an enlarged cross-section taken along line of FIG. 2.
Figure 4:
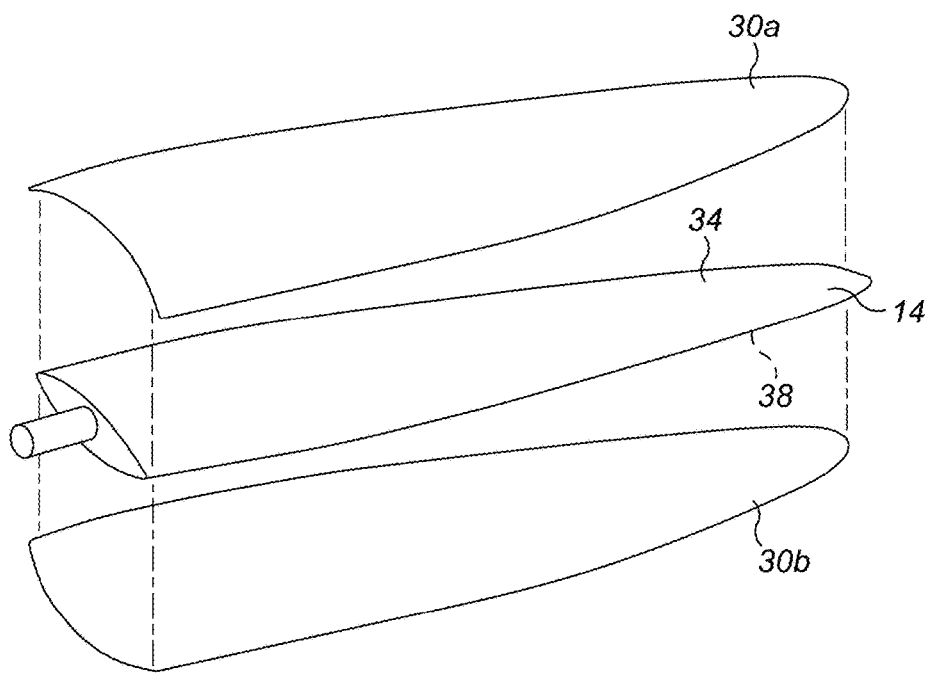
FIG. 4 illustrates an exploded view of the propeller blade of FIG. 1.

With continuing reference to FIGS. 1 and 2 and with reference to FIGS. 3 and 4, in a blade 2 in accordance with the disclosure, rather than having an external structure which is formed by depositing, for example braiding, multiple layers of fiber around the blade spar 14, impregnating the layers with resin and curing or consolidating the layers, at least one pre-manufactured cover shell 30*a*, 30*b* is bonded to the spar 14 by means of a layer 32 of thermoplastic adhesive. The use of a thermoplastic adhesive is important as it will allow removal of the shell 30*a*, 30*b* should the blade 2 need to be repaired at a later stage. This will facilitate both the initial manufacture of the blade 2 and its subsequent repair.

As illustrated in FIG. 4, the blade may be provided with two cover shells 30*a*, 30*b*. The first cover shell 30*a* may cover all or substantially all of the face surface 34 of the blade spar 14 and, after mounting, form the face surface 36 of the blade 2. Similarly the second cover shell 30*b* may cover all or substantially all of the camber surface 38 of the blade spar 14 and, after mounting, form the face surface 40 of the blade 2. The first and second cover shell portions 30*a*, 30*b* will meet at the leading edge 8 and the trailing edge 10 of the blade 2 and thereby form the entire external surface of the blade 2. Of course in other embodiments, more or less than two cover shell portions 30*a*, 30*b* may be provided and they may not necessarily cover the entire blade surface. Also, the cover shell portions 30*a*, 30*b* may meet at locations other than the leading and trailing edges 8, 10 of the blade 2.

As discussed above, the shell sections 30*a*, 30*b* are pre-manufactured. Moreover, they may be manufactured for attachment to a specific blade spar 14. Thus a manufacturer or repairer may hold a stock of differently sized and shaped shells 30 for use in manufacturing and repairing different blades 2.

Each cover shell section 30*a* may comprise a plurality of layers 42*a*, 42*b*, 42*c*, (collectively referred to as layers 42) as illustrated schematically in FIG. 3. The particular number of layers 42 and their structure and composition will be determined by the particular blade 2 being manufactured.

In some embodiments, the layers 42*a* . . . may include one or more layers of fiber reinforced material, for example thermoset or thermoplastic impregnated fiber layers. The layers 42 may be of a woven construction, for example. In various embodiments, the cover shell section 30 may comprise one, two or three layers 42*a*, 42*b*, 42*c*. The layer(s) may be of Kevlar®, glass fiber or carbon fiber for example.

In various embodiments, the layers 42 may also include an embedded lightning protection layer 42*b*. This would typically be in the form of an electrically conductive element, for example a metallic mesh, metallic braid or metallic tape, e.g. copper tape, provided along a length of the blade 2. The layers 42 may also include an erosion resistant outer layer 42*c* at least in an area of the cover shell 30*a*, 30*b* forming an area of the blade expected to experience high erosion, such as in a leading edge region. An anti-collision paint may also be applied onto regions of the cover shells 30*a*, 30*b* to improve visibility of the blade and thereby avoid people inadvertently walking into the blade when it is rotating.

The cover shell 30*a*, 30*b* may also comprise de-icing features and/or a leading edge protection feature such as a metallic sheath.

The cover shells 30*a*, 30*b* are therefore pre-manufactured such that, upon attachment to the blade spar 14, no substantive additional processing may be necessary on the external surface of the blade 2.

The assembly of the blade 2 will now be described.

As a first step, the blade spar 14, with its surrounding fiber layer 22 may be prepared in a conventional manner, by forming the structural spar 16, attaching the leading edge and trailing edge inserts 18, 20 thereto and positioning and curing the surrounding fiber layer 22.

Appropriate cover shells 30*a*, 30*b* are then attached to the blade spar 14. As discussed above, the shells 30*a*, 30*b* are pre-manufactured for attachment to the particular shape and size of blade spar 14 being used.

To attach the cover shells 30*a*, 30*b* to the blade spar 14, a layer 32 of thermoplastic adhesive is then provided between the blade spar 14 and the cover shells 30*a*, 30*b*. The adhesive may be provided on just one of the components, for example either of the cover shells 30*a*, 30*b* or the blade spar 14, but a better bond may be provided by applying adhesive to both the cover shells 30*a*, 30*b* and the blade spar 14. The adhesive may be pre-applied to the cover shells 30*a*, 30*b* (and indeed the blade spar 14) as part of its manufacturing process, or it may be applied at the time of bonding.

The cover shells 30*a*, 30*b* are then positioned on the blade spar 14. Pressure may be applied to the cover shells 30*a*, 30*b* to ensure good contact between the cover shells 30*a*, 30*b* and the blade spar 14. For example, the process may be carried out in a vacuum bag which will press the cover shells 30*a*, 30*b* into firm contact with the blade spar 14.

The assembly is then heated in order to melt the thermoplastic adhesive for bonding. The temperature required to effect this will depend on the particular adhesive used. For example, some adhesives may melt at or below 180° C. The adhesive should be chosen such that the temperature needed to melt the adhesive should not be so high as to damage the materials of either the blade spar 14, for example the foam inserts 18, 20 thereof, or the cover shell 30a, 30b. Suitable adhesives may include, for example PPO/PS (polyphenylene oxide/polystyrene), a modified PA (polyamide), PEI (polyether imide), PAEK (polyaryletherketone) or PEKK (polyetherketoneketone). The particular adhesive used will depend on the particular blade construction and materials.

The cover shells 30a, 30b will normally be attached one at a time to facilitate handling of the blade.

The heating may be effected in any suitable manner. For example, the assembly may be placed in a temperature controlled atmosphere such as an oven and heated therein. In an alternative arrangement, heat may be applied to the relevant area by means of a heating blanket applied to the blade 2. In a yet further arrangement, an infra-red heater may be used. A yet further heating mechanism will be described further below.

After an appropriate heating period, the assembly may be left to cool to allow the bond between the blade spar 14 and the cover shells 30a, 30b to form.

The external surface of the blade 2 formed by the cover shells 30a, 30b will not need substantial finishing, apart perhaps from removal of excess adhesive which may have exuded from between the cover shells 30a, 30b.

Thus, the blade 2 as described above is simple to manufacture and allows pre-manufacture of a range of standard cover shells 30a, 30b which can then be applied to a chosen blade spar 14 to produce a blade 2. Minimal assembly and finishing of the blade 2 is required. Moreover, as a thermoplastic adhesive is being used, if a problem is noted with the cover shell after assembly, it may simply be removed by re-heating the adhesive and a replacement cover shell 30a, 30b applied. This avoids the potential scrapping of an entire blade 2 as might happen with conventional constructions.

This ability to remove the cover shells 30a, 30b also facilitates repair of a damaged blade 2.

If a blade 2 becomes damaged in use, then one or more of the cover shells 30a, 30b which have been damaged can be removed by heating the blade 2 to a temperature which softens or melts the adhesive layer 32 allowing the cover sheet 30a, 30b to be removed.

The underlying surface of the blade spar 14 may then be prepared to receive a new cover shell 30a, 30b, for example by cleaning to remove extraneous matter and to provide a suitable bonding surface. A new layer of thermoplastic adhesive may then be deposited on the blade spar 14 in order to receive a new cover shell 30a, 30b. The new cover shell 30a, 30b may already be provided with a layer of adhesive, as described above. The new cover shell 30a, 30b is then positioned on the blade spar 14 and attached as during the manufacturing process. The repaired blade 2 may then be finished as necessary, as in the manufacturing process.

The process described in the above embodiment not only simplifies the repair process but also allows premanufactured and tested/inspected components to be assembled which may reduce the need for extensive inspection and testing of the repaired blade. The cover shells 30a, 30b may be non-destructively tested prior to application by any suitable technique such as ultrasound, X-ray or tap-testing. It also avoids the need to stock and store multiple components. In addition, the repair process can be carried out relatively quickly as there is no need to cure layers of repair material as in existing procedures.

The embodiment described above is merely exemplary and the skilled person will recognise that modifications may be made thereto without departing from the scope of the disclosure.

In the embodiment above, the cover shells 30a, 30b may, during their manufacture, be provided with protective features at their leading edges. For example, they may be provided with a de-icer comprising one or more heating elements and a protective sheath, for example of a metallic material such as nickel. In an alternative embodiment, illustrated in FIG. 5, these features are provided as separate components.

Figure 5:
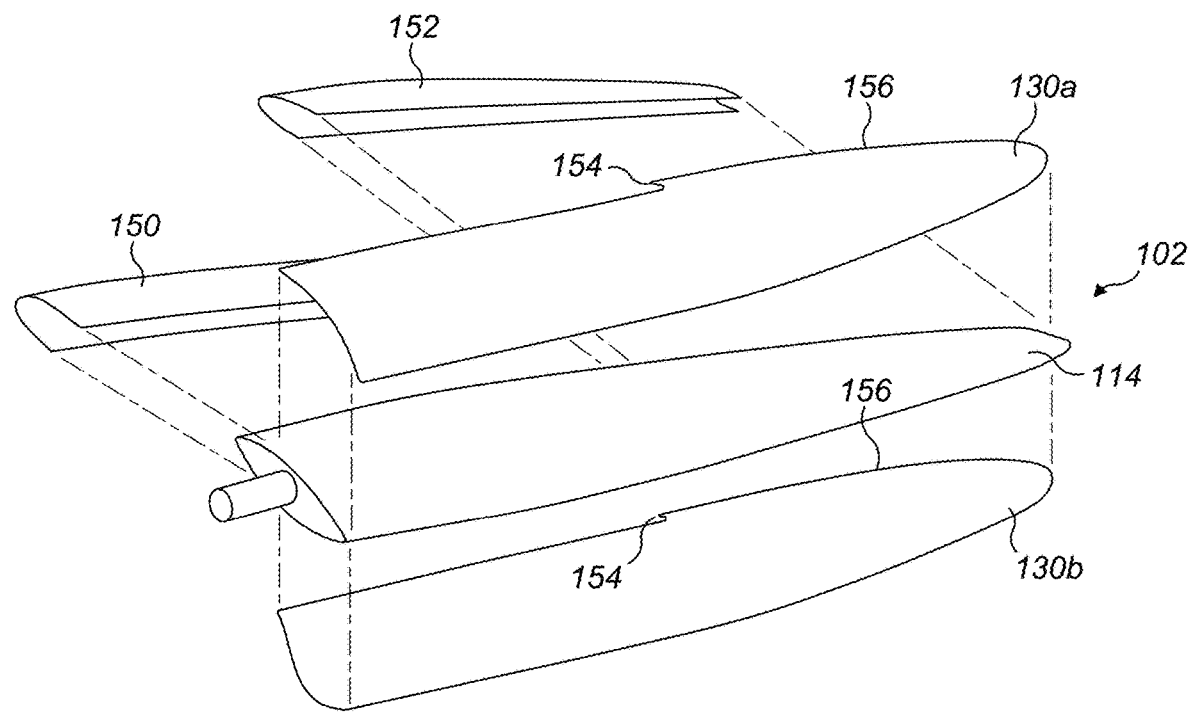
FIG. 5 illustrates an exploded view of an alternative embodiment of a propeller blade in accordance with the disclosure.

Thus with reference to FIG. 5, in this embodiment the blade 102 comprises a blade spar 114 having cover shells 130a, 130b and a separate (rather than an integrated) de-icer 150 and leading edge protective sheath 152. The de-icer 150 may comprise just a de-icer element or comprise additional layers of fibers.

In this embodiment the de-icer 150 is received in recesses 154 formed in the respective edges 156 of the cover shells 130a, 130b. In certain embodiments, the cover shells 130a, 130b do not overlie the de-icer 150 so that one of the components can be removed without removing the other. The sheath 152 also may not overlie the cover shells 130a, 130b or the de-icer 150 so that one of the components can be removed without removing the other.

The de-icer 150 and the sheath 152 are also adhesively attached to the blade 2 by means of a thermoplastic adhesive. This may be the same adhesive as attaches the cover shells 130a, 130b to the blade 2 or a different adhesive. By choosing an appropriate adhesive, it may be possible to remove just the de-icer 150 or the leading edge sheath 152 by heating that component without removing the cover shells 130a, 130b.

In the exemplary method described above, it was mentioned that the heating necessary to melt the thermoplastic adhesive during manufacture or repair may be provided by placing the blade 2 in an appropriate heated environment, by applying a heating blanket or using an infrared heater. It was also mentioned that certain cover shells 30a, 30b may incorporate lightning protection in the form of an electrically conductive layer such as a metallic mesh layer 42b. It has been recognised that in such embodiments, it may be possible to provide at least some of the heating required for the melting of the adhesive by passing an electric current through that layer 42b.

FIG. 6 illustrates, schematically, a possible heating arrangement using this concept. As shown, the mesh layer 42b of a cover shell 30a is connected to a power source 200 through appropriate electrical connections 202, 204. A switch 206 and controller 208 may also be provided to control the heating effect provided by the mesh layer 42b. The heat produced by the mesh layer 42b is close to the adhesive layer 32 and therefore provides heat in a targeted and efficient manner which may reduce overheating of other components of the blade 2.

It will also be appreciated that this heating technique may be used more widely than in the arrangement described above.

Conventional propeller blade constructions include a multi-layer cured fiber reinforced skin which may also incorporate a lightning protection layer. By passing an electric current through the lightning protection layer, it may be possible to heat the skin. The heat generated could be used during initial manufacture or repair of the blade in order to assist in curing of the layers of the blade skin. This may reduce or completely remove the need for external heating to effect curing. Moreover, it may be possible with an appropriate layout of lightning protection layer to heat just selected regions of the blade, thereby reducing energy requirements.

In addition, the heating may be used to assist in blade finishing processes such as in assisting the drying of paint applied to the external surface of a blade. This may accelerate the process, which particularly in the case of repair is advantageous.

From the above it will be seen that the disclosure provides, in its various embodiments, an advantageous blade construction and manufacturing and/or repair method which streamlines manufacturing and/or repair.

It will also be appreciated that modifications may be made to the above embodiments without departing from the scope of the disclosure.

For example, while the embodiments primarily describe the attachment of one or more composite cover shell sections 30a, 30b to a blade spar 14, it will be understood that the disclosure extends to the attachment of other components to a blade spar 14 using a thermoplastic adhesive. For example the attachment of a de-icer 150 or sheath 152 to a blade leading edge 8 is also described and encompassed by the disclosure. Other components may be attached to the blade spar surface in a similar manner.

The invention claimed is:

1. A propeller blade comprising:
   a composite blade spar; and
   at least one cover shell section adhesively bonded to the blade spar by a thermoplastic adhesive;
   wherein the at least one cover shell section comprises a plurality of layers; and
   wherein the layers comprise an electrically conductive lightning protection layer which can be heated in order to heat the thermoplastic adhesive.

2. A propeller blade as claimed in claim 1, comprising a first cover shell section covering a first side of the blade spar and a second cover shell section covering a second side of the blade spar.

3. A propeller blade as claimed in claim 1, wherein the at least one cover shell section comprises at least one fiber reinforced layer.

4. A propeller blade as claimed in claim 1, wherein the layers comprise an external erosion resistant layer.

5. A propeller blade as claimed in claim 1, wherein the blade spar comprises a structural spar element and leading and trailing edge cores, and a fiber layer wrapped around the structural spar element and the cores.

6. A propeller blade as claimed in claim 1, further comprising an erosion resistant sheath and/or electrical de-icer bonded to the blade with a thermoplastic adhesive.

7. A propeller blade as claimed in claim 1, wherein the thermoplastic adhesive is a PPO/PS (polyphenylene oxide/polystyrene) or a modified PA (polyamide), PEI (polyether imide), PAEK (polyaryletherketone) or PEKK (polyetherketoneketone) adhesive.

8. A propeller blade according to claim 1, wherein the electrically conductive lightning protection layer comprises a metallic mesh.

9. A propeller blade according to claim 1, wherein the electrically conductive lightning protection layer is connected to a power source through electrical connections.

10. A propeller blade according to claim 1, wherein the electrically conductive lightning protection layer is close to the adhesive such that the electrically conductive lightning protection layer can provide heat in a targeted manner to reduce overheating of other components of the blade.

11. A propeller blade according to claim 1, wherein the electrically conductive lightning protection layer is configured to receive a current in order to heat the thermoplastic adhesive.

12. A method of repairing a propeller blade comprising a composite blade spar and at least one cover shell section adhesively bonded to the blade spar by a thermoplastic adhesive, the method comprising:
    heating the propeller blade to a temperature above the melting temperature of the thermoplastic adhesive;
    removing a damaged shell section; and
    adhesively bonding a replacement cover shell section to the blade using a thermoplastic adhesive, wherein the heating includes heating an electrically conductive lightning protection layer provided in the at least one cover shell section.

13. A method as claimed in claim 12, wherein a layer of thermoplastic adhesive is deposited on opposed surfaces of the blade spar and the at least one cover shell section prior to attachment of the at least one cover shell section to the blade spar.

14. A method as claimed in claim 12, wherein the heating includes passing an electric current through the electrically conductive layer provided in the at least one cover shell section.

15. A method as claimed in claim 12, wherein the same thermoplastic adhesive is used to attach the replacement cover shell section as attached the original cover shell sections.

* * * * *